(12) United States Patent
Kamkar et al.

(10) Patent No.: US 10,674,365 B1
(45) Date of Patent: Jun. 2, 2020

(54) SYSTEMS AND METHODS FOR PREVENTING RELAY ATTACKS

(71) Applicant: OpenPath Security Inc., Culver City, CA (US)

(72) Inventors: Samy Kamkar, Los Angeles, CA (US); Alexander A. Kazerani, Santa Monica, CA (US)

(73) Assignee: OPENPATH SECURITY INC., Culver City, CA (US)

( * ) Notice: Subject to any disclaimer, the term of this patent is extended or adjusted under 35 U.S.C. 154(b) by 0 days.

(21) Appl. No.: 16/583,605

(22) Filed: Sep. 26, 2019

(51) Int. Cl.
| | |
|---|---|
| H04L 9/32 | (2006.01) |
| H04W 12/12 | (2009.01) |
| H04L 29/06 | (2006.01) |
| H04W 12/00 | (2009.01) |
| H04W 12/06 | (2009.01) |
| H04W 12/08 | (2009.01) |

(52) U.S. Cl.
CPC ..... *H04W 12/1202* (2019.01); *H04L 63/0428* (2013.01); *H04L 63/08* (2013.01); *H04L 63/102* (2013.01); *H04L 63/107* (2013.01); *H04L 63/1416* (2013.01); *H04L 63/1466* (2013.01); *H04W 12/0013* (2019.01); *H04W 12/06* (2013.01); *H04W 12/0802* (2019.01); *H04W 12/1204* (2019.01)

(58) Field of Classification Search
CPC ......... H04W 12/1202; H04W 12/1204; H04W 12/0013; H04W 12/06; H04W 12/0802; H04L 63/0428; H04L 63/102; H04L 63/107; H04L 63/1416; H04L 63/08; H04L 63/1466
USPC .......................................................... 713/168
See application file for complete search history.

(56) References Cited

U.S. PATENT DOCUMENTS

| | | | |
|---|---|---|---|
| 9,560,426 B1* | 1/2017 | Daniel | ................. H04L 67/125 |
| 2003/0216143 A1* | 11/2003 | Roese | ....................... G01S 5/02 |
| | | | 455/456.1 |
| 2017/0303015 A1* | 10/2017 | Herges | ..................... H04Q 9/00 |
| 2019/0016302 A1* | 1/2019 | Saiki | ...................... B60R 25/24 |

\* cited by examiner

*Primary Examiner* — Samson B Lemma
(74) *Attorney, Agent, or Firm* — Ansari Katiraei LLP; Arman Katiraei; Sadiq Ansari

(57) ABSTRACT

A two-part security method and system is provided to prevent unauthorized access to a secured resource via a relay attack that uses at least one intermediary device to relay signaling from an authorized access device to the secured resource despite the access device being out-of-range of the secured resource. The first part involves detecting a relay attack by encrypting signaling between the access device and the secured resource, and by detecting when the signaling is modified as a result of an intermediary device inserting data or modifying the data of the signaling exchanged between the access device and the secured resource. The second part involves detecting a relay attack based on environmental data from the access device that identifies a feature of an environment in which the access device is located, and the environmental data mapping to a location that is not within a specified location of the secured resource.

20 Claims, 11 Drawing Sheets

SYSTEMS AND METHODS FOR PREVENTING RELAY ATTACKS

BACKGROUND ART

Wireless or keyless access is becoming more prevalent, and is supplementing or replacing traditional key-based methods of access. Wireless access allows a user to wirelessly unlock, access, activate, control, use, or operate different secured resources with minimal or no interaction by the user. Some examples of secured resources that may accessed without keys and with minimal or no interaction by the user include vehicles, points of entry (e.g., doors, gates, turnstiles, elevators, and/or other physical barriers), security systems, lighting systems, climate control systems, and/or other remote keyless systems and devices. For example, a user may unlock a vehicle and turn on the vehicle by the user simply moving an access device, that remains in the user's pocket, in range of the vehicle.

Security is a concern for any wireless or keyless access methodology or system. Relay attacks are one such security risk. A successfully executed relay attack allows an attacker to unlock, access, or operate a secured resource by simply extending the signaling between an authorized user's access device and the secured resource.

FIG. 1 illustrates an example of a successful relay attack. Secured resource 110 may emit (at 1) a short-range radio signal. First attacker 120 may position a first relay attack device next to secured resource 110. The first relay attack device may receive (at 1) signaling from secured resource 110, and may transmit (at 2) the signaling unchanged over a wireless network to a second relay attack device of second attacker 130.

Second attacker 130 may position the second relay attack device adjacent to an access device of authorized user 140. The access device may be used to unlock, access, or operate secured resource 110 when the access device is placed next to secured resource 110 (e.g., within a few inches or few feet of secured resource 110).

In this figure, the access device, that is carried by authorized user 140, is too far away from secured resource 110 for the access device to have any effect. However, the second relay attack device of second attacker 130 is brought in range of the authorized user's 140 access device, and the second relay attack device emits (at 3) the signaling of secured resource 110 that is captured and replayed by the first relay attack device of first attacker 120.

The access device detects the signaling of secured resource 110 as a result of the signaling being replayed over a long distance by the first and second relay attack devices of first attack 120 and second attacker 130. The access device has no means of distinguishing between the signaling originating from secured resource 110 or from a relay attack device of an attacker. Consequently, the access device operates as if it was physically next to secured resource 110 and receiving the signaling directly from secured resource 110. In particular, the access device may provide (at 4) signaling that include access credentials and/or other data for requesting and/or authorizing access to secured resource 110.

The second relay attack device of second attacker 130 may capture (at 4) the signaling provided by the access device, and may transmit (at 5) the signaling from the access device to the first relay attack device of first attacker 120. The first relay attack device of first attacker 120 may then replay (at 7) the access device signaling for secured resource 110, tricking secured resource 110 into detecting that the access device of authorized user 140 is physically next to secured resource 110, that the access device is originating the signaling with the access credentials, and/or that secured resource 110 is exchanging radio signaling directly with the access device of authorized user 140. In other words, the relay attack devices of attackers 120 and 130 bridge the distance between the access device and secured resource 110 that normally prevents the devices from communicating with one another by simply transferring the unmodified signaling over a long-range network connection and replaying the signaling at either end of the connection.

In response to the signaling, that is originated by the access device of authorized user 140 and that is replayed from the first relay attack device of first attacker 120, secured resource 110 may open, unlock, grant, or otherwise provide (at 8) access. First attacker 120 may then access, use, or operate secured resource 110 without breaking into secured resource 110 or physically stealing the access device from authorized user 140.

It should be noted that the relay attack would be carried out in a similar manner if the initial signaling is emitted from the access device instead of secured resource 110. In this case, the second relay attack device of second attacker 130 would be used to pass the initial signaling to the first relay attack device of first attacker 120, and the initial signaling may be used to initiate or complete the access procedure with secured resource 110.

DETAILED DESCRIPTION

Figure 1:
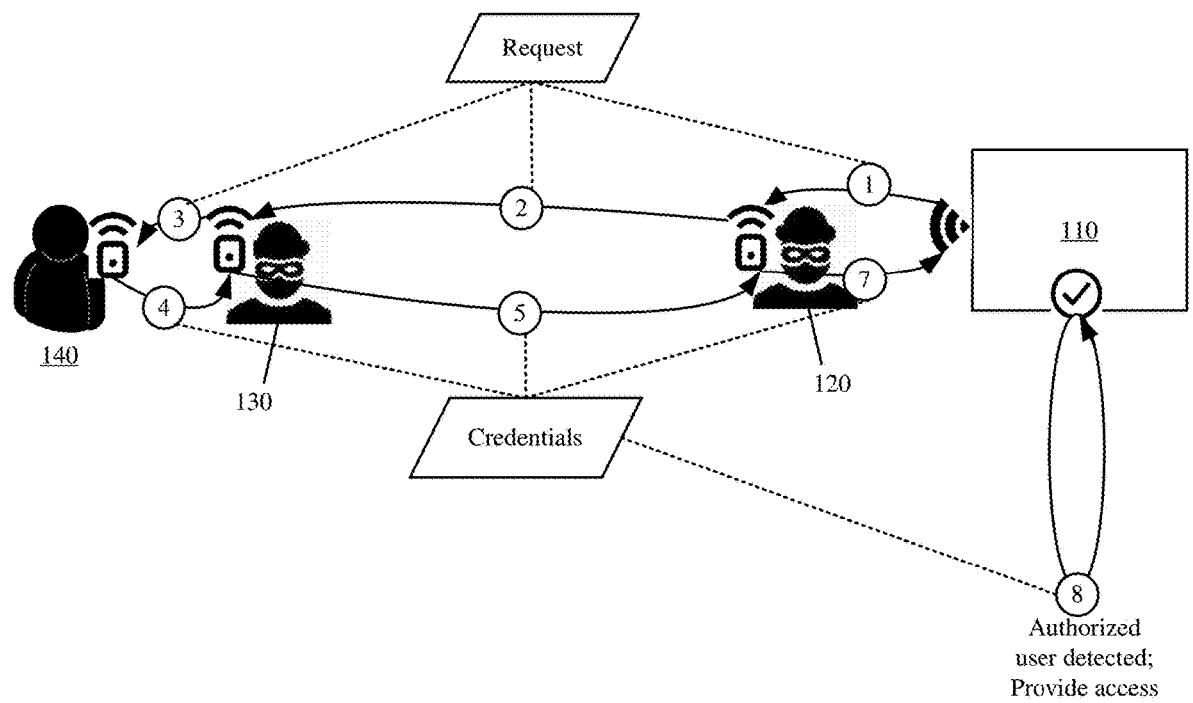
FIG. 1 illustrates an example of a successful relay attack.

The following detailed description refers to the accompanying drawings. The same reference numbers in different drawings may identify the same or similar elements.

Systems and methods, as provided herein, prevent relay attacks against secured resources that may be unlocked, operated, controlled, activated, used, or otherwise accessed wirelessly, without physical keys, and/or with no or minimal human interaction. The systems and methods may include a two-part security solution for verifying that the signaling that is used to authorize access to a secured resource is transmitted directly from an access device of an authorized user, and not some intermediary or relay attack device, and that the signaling is unchanged during transmission.

In some embodiments, the first part of the security solution may include encrypting communications between an authorized user's access device and the secured resource. Although a relay attack may transmit encrypted communications between relay attack devices that are located near the access device and the secured resource, the encryption ensures that the communications are not interfered with or changed by any intermediary device including the relay attack devices of potential attackers. Accordingly, the encryption prevents the intermediary devices or relay attack devices from injecting or modifying the data of the communications between the access device and the secured resource.

In some embodiments, the second part of the security solution may include supplementing the signaling, that is provided by the authorized user's access device, to include environmental data that identifies some feature about the environment or location of the authorized user or access device. For instance, an onboard sensor or radio of the access device may detect and obtain the environmental data, and the access device may then insert the environmental data into the encrypted communications that are passed to the secured resource, and/or that are used to request, authorize, or obtain access to the secured resource. The environmental data may then be used to detect the presence or absence of a relay attack against the secured resource. In particular, the environmental data may be used to verify whether the signaling, that is originated by the access device and that is used to request or authorize access to the secured resource, is being transmitted from the access device and not a relay attack or other intermediary device. For instance, if the environmental data identifies the access device to be away from or in a different location than the secured resource, the secured resource or access control system can detect a relay attack and prevent access to the secured resource despite the received signaling providing access credentials of an authorized user or access device. Conversely, if the environmental data identifies the access device to be near or in the location of the secured resource, the secured resource or access control system can detect that the received signaling is indeed being transmitted by the access device and not some intermediary relay attack device, and access may be provided to the secured resource if the access credentials accompanying the receiving signaling are for a user or access device that is authorized to access the secured resource. Providing access to the secured resource or accessing the secured resource can include any one or more of unlocking, activating, operating, controlling, using, and/or other forms of interacting with the secured resource.

The first and second parts of the security solution complement one another. In particular, the encrypted communications prevent attackers from modifying or inserting their own environmental data into the signaling that is originated by the access device.

The two-part security solution can be adapted for almost any secured resource, that can be accessed wirelessly or without a key and/or that may be improperly accessed by a relay attack, so long as the access device for the secured resource supports encrypted communications and can obtain and provide the environmental data in conjunction with the signaling that is used to authorize or gain access to the secured resource. Consequently, the two-part security solution provided herein may be used with a variety of secured resources including, for example, vehicles, points of entry (e.g., doors, gates, turnstiles, elevators, and/or other physical barriers), security systems, climate control systems, and/or other remote keyless systems and devices.

In some embodiments, each secured resource may include a radio for transmitting and receiving signaling, and logic for providing or denying access based on signaling exchanged with an access device (e.g., authorizing access credentials and performing the two-part security solution). In some embodiments, a secured resource may be part of an access control system, and may be controlled by an access control unit ("ACU") of the access control system. The ACU may authorize access credentials and/or may perform the two-part security solution based on signaling that is directly exchanged with the access device, or based on signaling that is forwarded from the secured resource to the ACU.

Figure 2:
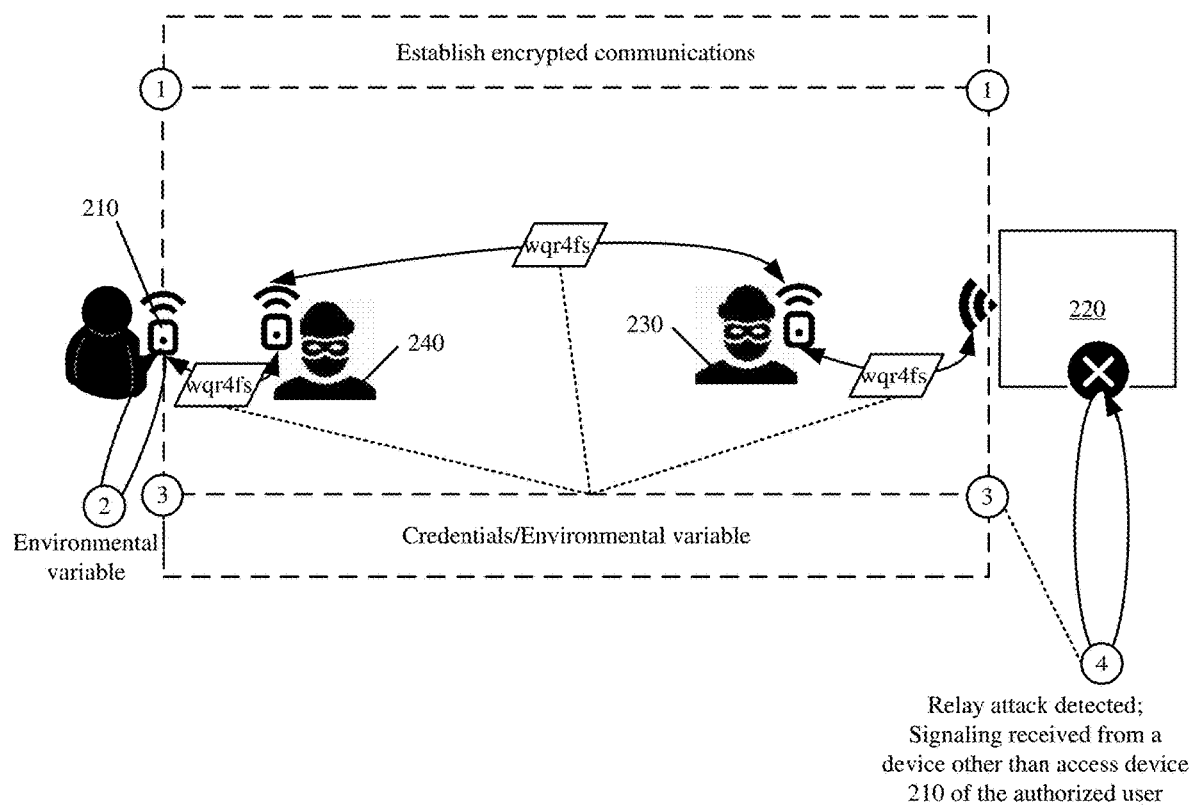
FIG. 2 illustrates an example of preventing a relay attack with the two-part security solution of some embodiments.

FIG. 2 illustrates an example of preventing a relay attack with the two-part security solution of some embodiments. FIG. 2 includes an authorized user with access device 210. Access device 210 may be used to unlock, operate, control, activate, interact with, use, or access secured resource 220 when placed a particular short distance (e.g., a few inches or a few feet) away from secured resource 220. More specifically, access device 210 may be used to unlock, operate, control, activate, interact with, use, or access secured resource 220 when placed within range of Bluetooth or other short-range wireless network signaling. In this figure, access device 210 is not within the particular short distance necessary for requesting, authorizing, and/or obtaining access to secured resource 220.

However, FIG. 2 also includes first attacker 230 with a first relay attack device that is within the particular short distance from secured resource 220, and second attacker 240 with a second relay attack device that is within the particular short distance from access device 210. First attacker 230 and second attacker 240 may work together to attempt a relay attack to gain unauthorized access to secured resource 220 using the credentials of the authorized user by hijacking and/or replaying signaling from access device 210 of the authorized user. In particular, the first and second relay attack device may be configured to relay signaling that each relay attack device receives from the other relay attack device to the nearby access device 210 or secured resource 220 over a wireless network connecting the relay attack devices, as well as to relay signaling from the nearby access device 210 or secured resource 220 to the other relay attack device over the wireless network. As a result, secured resource 220 may be fooled into detecting that access device 210 is within the particular short distance from secured resource 220 or vice versa, and the detected proximity may initiate an access procedure as well as the two-part security solution between access device 210 and secured resource 220.

As shown, secured resource 220 may establish (at 1) a secure communication channel, session, or connection with access device 210 prior to exchanging any access credentials or other access data. The devices 210 and 220 may perform a Secure Sockets Layer ("SSL"), Transport Layer Security ("TLS"), or other cryptographic protocol to encrypt communications. The first and second relay attack devices may transmit the signaling between access device 210 and secured resource 220, and may inspect any unencrypted messaging included in the transmitted signaling. However, the relay attack devices cannot access the private encryption keys used by access device 210 and secured resource 220 to encrypt subsequent communications, and therefore will be unable to decipher the contents of the messaging exchanged once the encryption handshake is complete. It should be noted that some encryptions protocols used to establish (at 1) the secure communication channel, session, or connection may include endpoint authentication to prevent a man-in-the-middle attack, and/or to prevent a relay attack device from acting as an endpoint of the encrypted channel, session, or connection.

Establishing (at 1) the secure communication channel, session, or connection completes the first part of the two-part security solution. Access device 210 may then shift to the second part of the two-part security solution by using an onboard sensor to obtain (at 2) at least one environmental data. The environmental data may provide information as to one or more features of the environment in which access device 210 is located.

Access device 210 may provide (at 3) the environmental data to secured resource 220 over the encrypted channel. Neither attacker 230 nor attacker 240 has the encryption keys needed to decrypt the signaling transmitted by access device 210. Consequently, attackers 230 and 240 are unable to modify or inject their own environmental data into the communications between access device 210 and secured resource 220.

Access device 210 may also provide (at 3) access credentials for authorizing access to secured resource 220 via the encrypted channel. In some embodiments, access device 210 may be authorized for accessing secured resource 220 as part of or in response to establishing (at 1) the encrypted communications. For instance, establishing (at 1) the encrypted communications may involve performing a mutual authentication, and the mutual authentication may include verifying the identity of access device 210 and/or access privileges of access device 210 to secured resource 220.

As shown in FIG. 2, the relay attack devices transmit the encrypted signaling from access device 210 to secured resource 220. Secured resource 220 is able to decrypt the signaling, and extract the environmental data and/or access credentials sent by access device 210.

Based on the access credentials, secured resource 220 may determine (at 4) that access device 210 is authorized for access. However, based on the environmental data, secured resource 220 may determine (at 4) that access device 210 is not located the particular short distance from secured resource 220, and is at another location away from secured resource 220. The environmental data therefore reveals the presence of the relay attack, and allows secured resource 220 to detect (at 4), that the signaling originating from access device 210, is transmitted to secured resource 220 by a relay attack device or other intermediary device (e.g., a device other than access device 210). The signaling therefore fails the two-step security solution, and secured resource 220 may prevent (at 4) access despite the received access credential authorizing access to secured resource 220.

Figure 3:
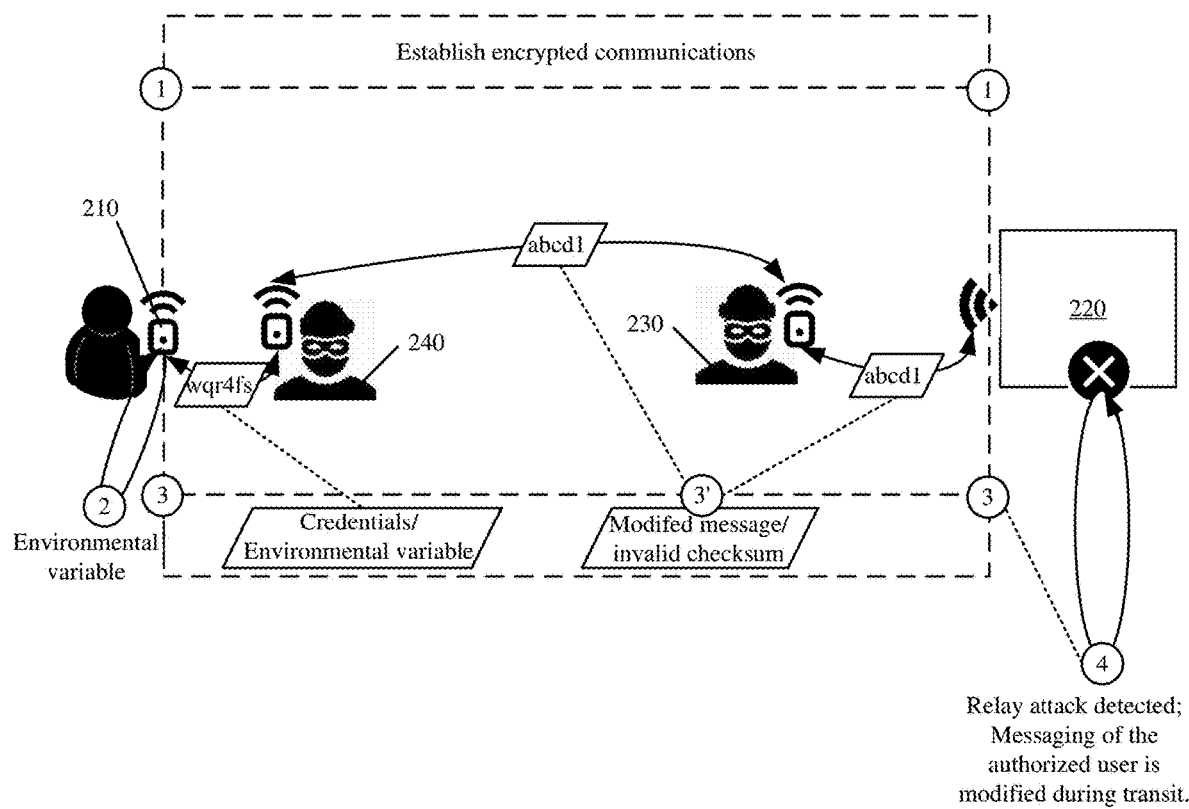
FIG. 3 illustrates an example of detecting a relay attack with the first part of the two-part security solution in accordance with some embodiments presented herein.

FIG. 3 illustrates an example of detecting a relay attack with the first part of the two-part security solution in accordance with some embodiments presented herein. As in FIG. 2, first and second attackers 230 and 240 use the relay attack devices to trick access device 210 and secured resource 220 into detecting that they are within the particular short distance from one another that is necessary for initiating the access procedure between access device 210 and secured resource 220.

Attackers 230 and 240 may know that secured resource 220 requires environmental data to verify proximity of access device 210. Accordingly, attackers 230 and 240 may attempt to modify (at 3') the signaling passing from access device 210 to secured resource 220 to change the environmental data provided by access device 210 or to insert their own environmental data into the signaling.

However, the first part of the two-part security solution involves encrypting the communications between access device 210 and secured resource 220 using private keys only known to access device 210 and secured resource 220 respectively. Accordingly, attackers 230 and 240 are unable to decipher or decrypt the messaging that is being passed (at 3) between access device 210 and secured resource 220 in order to insert or replace the environmental data provided by access device 210. Moreover, any attempt to change (at 3') the encrypted messaging or the relayed signaling for the encrypted messaging with the relay attack devices may corrupt the encrypted messages, and may result in messaging that cannot be deciphered or decrypted (at 4) by secured resource 220. Even if the relay attack devices were able to add a new environmental data (whether as part of the encrypted signaling or added as an unencrypted value), secured resource 220 would be able to detect (at 4) the change by determining that the checksum of the encrypted messaging does not match the received payload. In any case, access to secured resource 220 may be denied (at 4) even though the received access credentials authorize access to secured resource 220.

Figure 4:
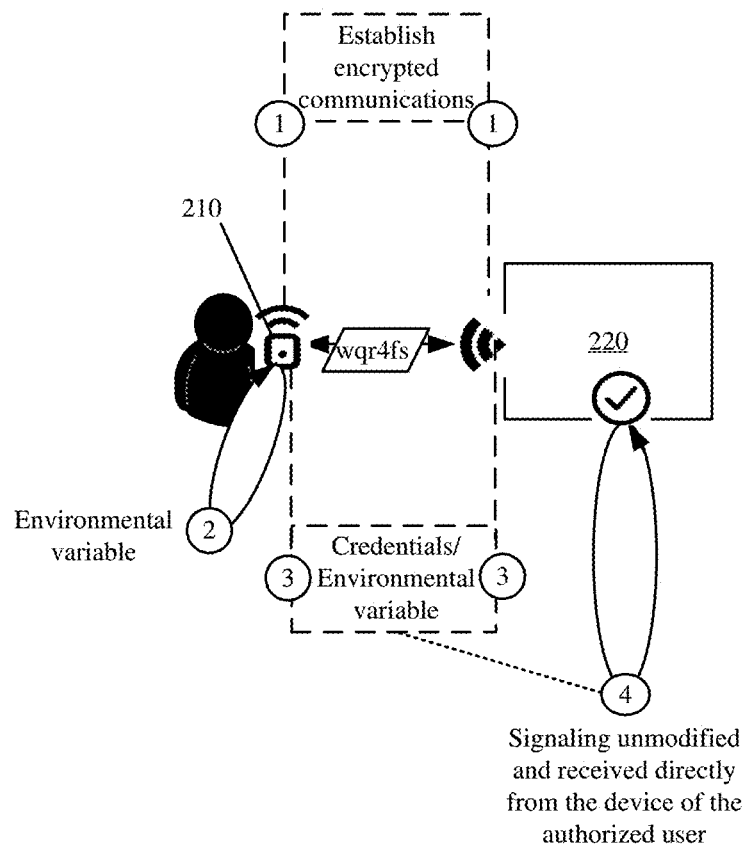
FIG. 4 illustrates an example of providing access to a secured resource in response to using the two-part security solution to verify that the secured resource directly receives signaling from an authorized access device in accordance with some embodiments presented herein.

FIG. 4 illustrates an example of providing access to secured resource 220 in response to using the two-part security solution to verify that secured resource 220 directly receives signaling from authorized access device 210 in accordance with some embodiments presented herein. The access procedure may be initiated in response to secured resource 220 detecting signaling of access device 210, access device 210 detecting signaling of secured resource 220, or some user-initiated action (e.g., pressing a button, performing a gesture, detecting the presence of a user, etc.).

In response to initiating the access procedure, secured resource 220 may establish (at 1) a secure channel, session, or connection with access device 210. In particular, secured resource 220 and access device 210 may perform (at 1) a security handshake for encrypting subsequent communications between secured resource 220 and access device 210.

Once the encryption handshake is complete or as part of encryption handshake, access device 210 may provide access credentials for authorizing access to secured resource 220. Despite being authorized to access secured resource 220, access may be withheld until the two-part security solution can verify that the authorization is not fraudulently obtained via a relay attack. In particular, the two-part security solution can verify that the encrypted signaling originated by access device 210 is transmitted directly from access device 210 to secured resource 220 without an intermediary device relaying the signaling as part of a relay attack, and/or that access device 210 is within a specified distance from secured resource 220 to directly receive and respond to signaling from secured resource 220.

The first part of the two-part security solution is completed as a result of having established the encrypted communications between access device 210 and secured resource 220. As noted above, the first part of the two-party security solution ensures that messaging between access device 210 and secured resource 220 is not modified during transfer.

To perform the second part of the two-part security solution, access device 210 may use a sensor to obtain (at 2) data about the environment in which access device 210 is located. The data is included as part of the environmental data that is passed (at 3) from access device 210 to secured resource 220 via the encrypted signaling.

Secured resource 220 may decrypt the received signaling to extract the environmental data. Secured resource 220 may verify (at 4) that the environmental data contains one or more values that match to expected data or values for that environmental data. In particular, secured resource 220 may verify (at 4) that the environmental data identifies a location that is near or is a threshold distance from a location of secured resource 220. In response to successfully verifying (at 4) the location of access device 210 be near the location of secured resource 220 by the threshold distance based on the environmental data, secured resource 220 may determine that no relay attack is being used to transfer the signaling between access device 210 and secured resource 220, and/or to detect that the signaling received by secured resource 220 is transmitted directly from access device 210 and not a relay attack device or other intermediary device. Accordingly, access device 210 is authorized for access and verified to be the transmitting source of the signaling received by secured resource 220. In response, secured resource 220 may be unlocked (at 4), operated, controlled, activated, interacted with, used, or otherwise accessed.

In some embodiments, the environmental data may include any one or more of geolocation coordinates, an altitude, a closest wireless network detected by access device 210, sounds recorded by access device 210, images taken by access device 210, and/or other data from which a relative or exact position of access device 210 may be derived. Environmental data from which a relative position may be derived may include data obtained by a sensor of access device 210 that is compared to data obtained by a sensor of secured resource 220, and if the compared data matches or is within an expected range of one another, then it can be determined that the devices are near one another. Environmental data that provides an exact position may include data that independently identifies a position of access device 210 without having to reference or compare against data of secured resource 220.

An example of environmental data providing an exact position may include access device 210 using a Global Positioning System ("GPS") chip to obtain geolocation coordinates, and providing these coordinates as the environmental data to secured resource 220 via the encrypted channel, session, or connection. Secured resource 220 or an access control system may then determine if the provided coordinates are within a threshold distance of secured resource 220 in order to satisfy and successfully complete the second part of the two-part security solution.

An example of environmental data providing a relative position may include access device 210 using a wireless radio to detect the Service Set Identifier ("SSID") or other identifiers for nearby WiFi networks, Bluetooth networks or devices, and/or Radio Access Networks ("RANs") of a wireless telecommunications network. Access device 210 may provide these identifiers as the environmental data to secured resource 220 via the encrypted channel, session, or connection. Secured resource 220 or an access control system may then determine if the provided identifier(s) match to identifier(s) of wireless networks or devices that are in range of secured resource 220 in order to satisfy and successfully complete the second part of the two-part security solution.

Other examples of environmental data providing relative positioning include comparing sounds or images obtained by a sensor of access device 210 to sounds or images obtained by a sensor of secured resource 220 in order to determine if the devices are exposed to the same environmental conditions, and thereby determine that the devices are near one another. Still another example may include comparing the signal strength of radios for access device 210 and secured resource 220 when the devices are directly connected or communicating with one another via a wireless network or signaling created by one of the devices. For instance, if access device 210 and secured resource 220 use a Bluetooth radio for communications, the devices may be connected to one another. Accordingly, if access device 210 is moving towards secured resource 220, then the radio of each device may show a similar change or increase in signal strength, whereas if relay attack devices were used to relay the signaling between the devices, the signal strength measurements provided as the environmental data may vary for access device 210 and secured resource 220.

Figure 5:
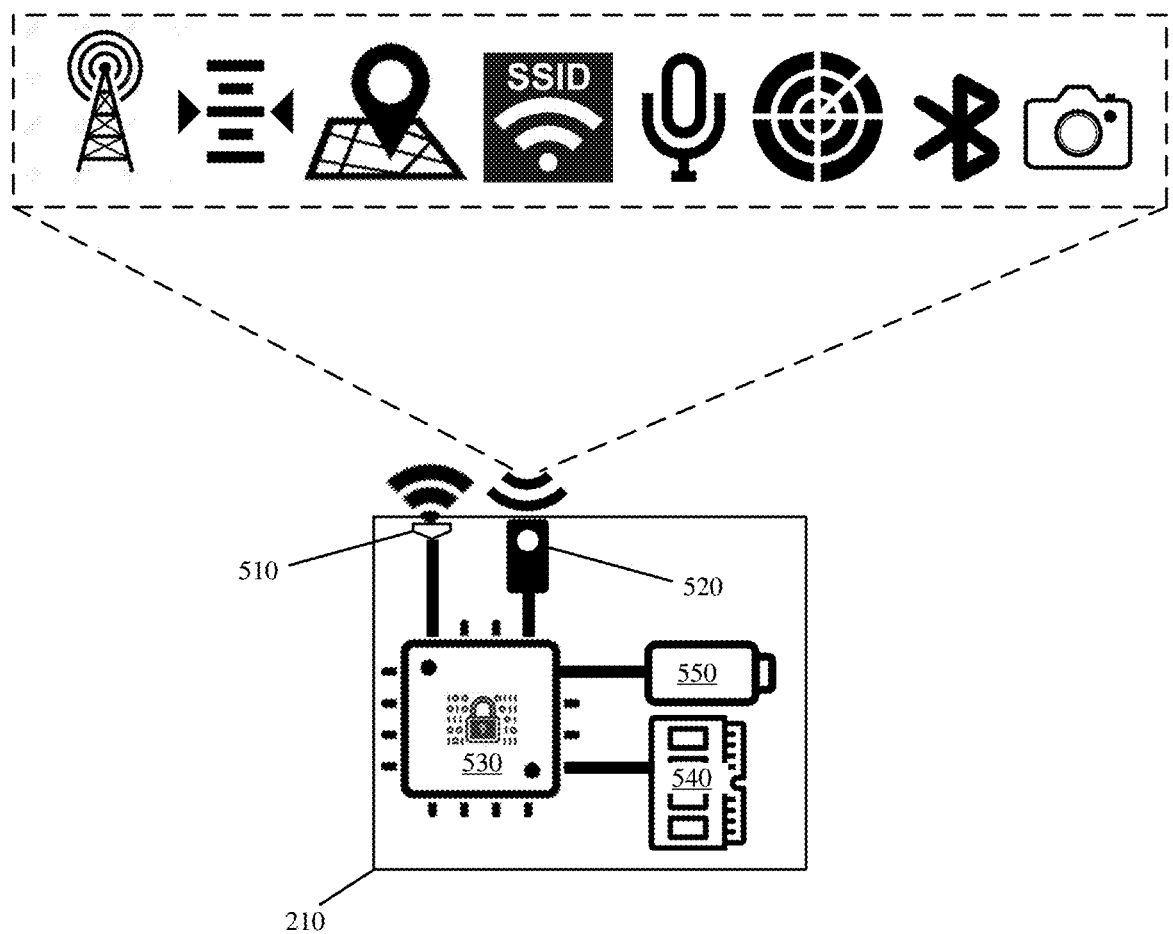
FIG. 5 illustrates an example access device in accordance with some embodiments presented herein.

FIG. 5 illustrates an example access device 210 in accordance with some embodiments presented herein. As shown in FIG. 5, access device 210 may include one or more of radio 510, sensor 520, processor 530, storage 540, and power source 550.

Different access devices 210 may include additional or fewer components. For instance, a first type of access device 210 may include a mobile telecommunications device (e.g., smartphone) that has two or more radios 510 for communicating across different wireless networks and/or different wireless frequencies. The first type of access device 210 may run an application, program, or other machine-executable code for performing one side of the two-part security solution (e.g., establishing the encrypted communications, obtaining the environmental data, and providing the environmental data). A second type of access device 210 may include a sensor-modified keyless fob, proximity card, or smartcard that includes a single radio 510, and a different processor 530 than first access device 210 that is configured or includes firmware for performing one side of the two-part security solution. The second type of access device 210 may omit sensor 520 (e.g., by populating the environmental data with wireless networks detected by radio 510) and power source 550 altogether.

In any case, access device 210 may represent a variety of different devices with different form factors and different functionality for accessing different secured resources 220. Moreover, existing access devices may be used or adapted to be used with the two-part security solution described herein. Accordingly, access device 210 may include mobile telephones, smartwatches, keycards, fobs, Radio-Frequency Identification ("RFID") tags, Internet-of-Things ("IoT") devices, laptop computers, tablet computing devices, wireless dongles, and/or other devices with one or more of the components illustrated in FIG. 5.

Radio 510 may include a wireless signaling transmitter and receiver. Radio 510 may further include an antenna for sending and receiving the wireless signaling. Radio 510 may operate at the same signaling frequency as a radio of secured resource 220. In some embodiments, radio 510 may include a WiFi radio, a Bluetooth radio, other short-range radio, and/or other long-range radio. For instance, radio 510 may support signaling frequencies for Third Generation ("3G"), Fourth Generation ("4G"), Long Term Evolution ("LTE"), and Fifth Generation ("5G") wireless mobile telecommunications network communication. In some embodiments, access device 210 may include multiple radios to support communications over two or more different wireless networking technologies or different wireless signaling frequencies.

Sensor 520 may include an onboard circuit of access device 210 from which data about the environment, in which access device 210 is located, may be detected, tracked, or otherwise obtained. Sensor 520 may include one or more of a geolocation chip for one or more geolocation systems (e.g., GPS, Global Navigation Satellite System, BeiDou Navigation Satellite System, Galileo, etc.), altimeter, barometer, magnetometer, beacon receiver, RFID receiver, microphone, camera, infrared sensor, thermometer, radar, LiDAR, sonar, and/or other sensory modules. The environmental data obtained by sensors 520 can therefore include geographical coordinates, altitude, pressure, temperature, detected networks, signal strength, detected signaling frequencies, sound, image, speed, brightness, coloring, heading, detected objects, detected sizes, and detected shapes as some examples.

In some embodiments, access device 210 may have multiple sensors. For instance, a mobile telecommunications device may have a GPS chip, magnetometer, accelerometer, microphone, camera, and other sensors for detecting the environment around the device, and one or more of these sensors may be used to populate the environmental data.

In some embodiments, radio 510 may be used as sensor 520 or as a substitute for sensor 520. For instance, radio 510 may be used to detect nearby wireless networks (e.g., WiFi, Bluetooth, or different RANs of a wireless telecommunications network) or devices (e.g., secured resources 220), including the identifiers that may be broadcast or otherwise disseminated to identify the networks or devices. Radio 510 may further measure the signal strength, operating frequencies, and/or other environmental data associated with these networks and devices. Accordingly, a proximity card, smartcard, or other access device 210, that may lack a distinct sensor 520, may still use radio 510 as part of the two-part security solution of some embodiments.

The data that is obtained from sensor 520 can include any data about the environment surrounding access device 210 provided that some relative or exact position can be derived from the data. For instance, a microphone of access device 210 may be used to record sound in the environment surrounding access device 210 at the same time as a microphone of secured resource 220 records sound in the environment surrounding secured resource 220. If the sound recorded by the microphones of access device 210 and secured resource 220 match or are similar by some threshold amount, then the sound can be used to determine that access device 210 is physically near secured resource 220. Similarly, if access device 210 obtains an altitude measurement as the environmental data that is passed to secured resource 220, secured resource 220 may determine if the measured altitude for access device 210 matches to the building floor or level at which secured resource 220 is located (e.g., secured resource 220 is on the 22$^{nd}$ floor of an office building and the altitude of access device 210 matches to the height of the 22$^{nd}$ floor). As yet another example, an accelerometer may indicate that access device 210 is moving at a high rate of speed (e.g., greater than a walking or running speed of an average user), which is indicative of access device 210 being in a moving vehicle. Secured resource 220 may determine that access device 210 is not physically near secured resource 220 based on this environmental data when secured resource 220 is a fixed door or located in an office building.

As noted above, positional information may be directly or indirectly derived from the environmental data that is obtained by sensor 520 and/or radio 510 of access device 210. For instance, the geographical coordinates and altitude may directly convey location information, whereas detected networks, sound, speed, brightness, and/or data may provide relative data form which location information can be derived by comparing against data that is obtained from similar sensors or radios about the environment surrounding secured resource 220.

Processor 530 may be used to establish the encrypted channel, session, or connection with secured resource 220 or other system device, to decrypt received signaling, and to encrypt signaling before transmission by radio 510. Processor 530 may further perform the logic for responding to signaling from secured resource 220, and/or for generating the messaging to request and/or authorize access to secured resource 220, including generating the messaging to include the environmental data. For instance, processor 530 may generate the messaging for authorizing access to secured resource 220, may obtain one or more environmental variables from radio 510 or sensor 520, and may provide the one or more environmental variables as environmental data over the encrypted communication channel established with secured resource 220. In some embodiments, processor 530 may obtain different environmental data from different sensors 520 based on available sensors 520 or sensor data, messaging received from different secured resources 220, and/or based on different detected secured resources 220. Accordingly, the two-part security solution may involve different environmental data for different secured resources 220, and processor 530 may dynamically provide the different environmental data based on the secured resource 220 being accessed.

Storage 540 may store the access credentials for authorizing access to different secured resources 220. Storage 540 may securely store the cipher keys (e.g., private encryption keys) and/or other parameters by which access device 210 encrypts and decrypts communications. Storage 540 may also store the instructions for requesting and/or authorized access to secured resource 220 as well as the instructions for obtaining and providing the environmental data via the encrypted signaling.

Power source 550 may include an onboard battery or other power supply. Power source 550 may provide the power for operating radio 510, sensor 520, and/or processor 530. As noted above, power source 550 may be an optional component for some access devices 210. For instance, some access devices 210 may obtain power when placed within a magnetic field generated by secured resource 220, or when secured resource 220 provides an excitation signal that remotely powers access device 210.

Figure 6:
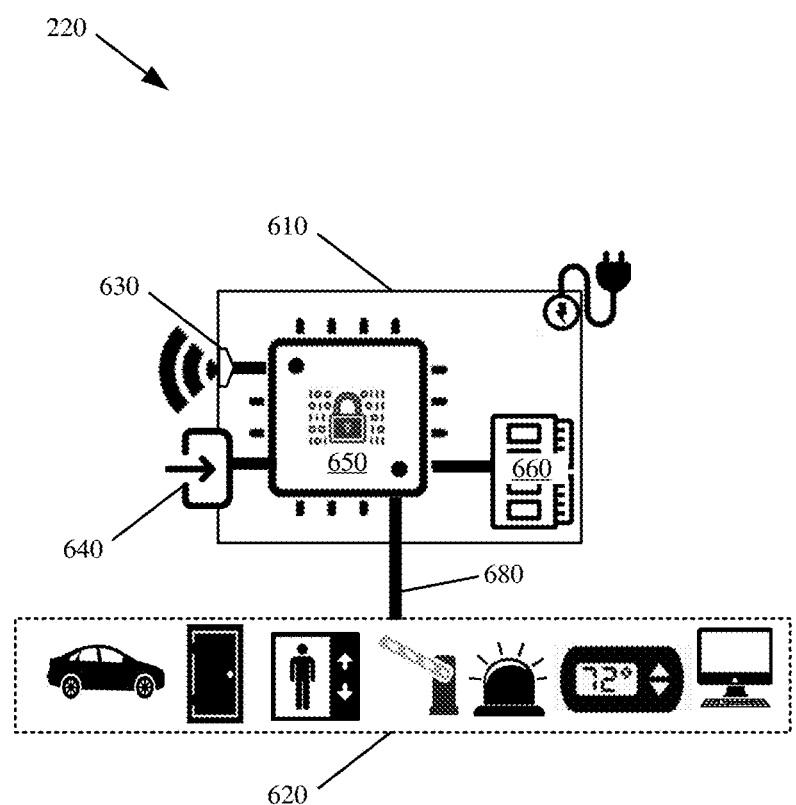
FIG. 6 illustrates an example secured resource in accordance with some embodiments presented herein.

FIG. 6 illustrates an example secured resource 220 in accordance with some embodiments presented herein. Secured resource 220 may include control module 610 and restricted-access system or device 620.

Control module 610 may located on or adjacent to restricted-access system or device 620. Control module 610 may provide the interface for requesting and/or authorizing access to restricted-access system or device 620. Control module 610 may also control the locking and unlocking, activation and deactivation, interaction with, usage of, access, and/or operation of restricted-access system or device 620 in some embodiments. Control module 610 may include one or more of radio 630, input device 640, processor 650, storage 660, power source 670, and control interface 680.

Radio 630 may operate at the same frequencies as radio 510 of access device 210 in order to wirelessly exchange signaling with access device 210. In some embodiments, radio 630 may include a WiFi radio, a Bluetooth radio, other short-range radio, and/or other long-range radio. Radio 630 may be used to create a wireless network for communicating with different access devices 210 that are in wireless range of radio 630. In some embodiments, radio 630 may broadcast, advertise, or otherwise disseminate an identifier to cause an in-range access device 210 to commence the access procedure with the two-part security solution. In some embodiments, radio 630 may be used to detect in-range access devices 210, and to initiate the access procedure with the two-part security solution with a detected access device 210.

Input device 640 may receive user input, and may initiate the access procedure with the two-part security solution in response to detected user input. In some embodiments, input device 640 may be a button that a user can press. Once pressed, control module 610 may perform the access procedure and two-part security solution with one or more access devices 210 that are detected to be within signaling range of radio 630. In some embodiments, input device 640 may be a camera, microphone, or other sensor that can detect when a user is within a particular distance from secured resource 220 or when the user performs a specific gesture or action. Here again, the gesture or action may be used initiate the access procedure and the two-part security solution.

Processor 650 may generate the secured resource 220 signaling for the access procedure. In particular, processor 650 may perform the security handshake with access device 210 in order to encrypt communications between the devices. In some embodiments, the security handshake establishes an SSL, TLS, or other encrypted channel, session, or connection between access device 210 and control module 610 of secured resource 220. Once the communications are encrypted, processor 650 may request access credentials from access device 210, may authorize access based on access credentials provided by access device 210, and/or may detect the presence or absence of a relay attack (e.g., that the signaling originating from access device 210 is being transmitted by access device 210 and not an intermediary device) by verifying the environmental data that is provided by access device 210. Processor 650 may also generate commands to control access to or operate restricted-access system or device 620, as well as messaging to communicate with other devices of an access control system (e.g., an ACU).

Storage 660 may store access privileges for different access devices 210 to restricted-access system or device 620. For instance, access device 210 may provide access credentials that uniquely identify access device 210, and processor 650 may query storage 660 using the access credentials to determine if access device 210 is permitted to access restricted-access system or device 620. Storage 660 may further store valid values for verifying the environmental data provided by access device 210. For instance, the two-part security solution may specify that access device 210 provide GPS coordinates, an altitude, and/or identifiers for nearby wireless networks, and storage 660 may store an expected set of GPS coordinates that are within a specific distance from the location of control module 610, an expected altitude corresponding to the building floor or level on which control module 610 is located, and/or the identifiers for wireless networks created by or that are in range of control module 610 so that the environmental data provided by access device 210 may be verified without referencing or otherwise obtaining data from a sensor of secured resource 220. In some embodiments, the expected values for the environmental data stored in storage 660 of a particular secured resource 220 may be configured at the time the particular secured resource 220 is installed or placed at a fixed location. In some other embodiments, control module 610 may learn the expected values for the environmental value based on a previous set of requests that resulted in authorized access or based on environmental values that access devices 210 provide over time. For instance, 95% of requests may be issued with environmental data that indicates a particular altitude. If control module 610 receives a request with environmental data having an altitude that differs from the particular altitude, control module 610 may detect a relay attack is being used to improperly relay the signaling for that request.

Power source 670 may be a continuous power supply for powering control module 610 and restricted-access system or device 620. In some embodiments, power source 670 may include a plug that is connected to an electrical outlet to provide secured resource 220 with a continuous supply of power. When restricted-access system or device 620 is a vehicle, power source 670 may be connected to a recharging battery of the vehicle, and may receive a continuous supply of power from the battery.

Power source 670 may also or alternatively include a battery. The battery can provide a backup power supply if the continuous power supply is interrupted. In some embodiments, the battery could exclusively power control module 610 and/or restricted-access system or device 620 for an extended period of time depending on power requirements of control module 610 and/or restricted-access system or device 620.

Control interface 680 may include a wired or wireless interface for controlling restricted-access system or device 620. Control module 610, via control interface 680, may send commands to lock or unlock restricted-access system or device 620, grant access to restricted-access system or device 620, or operate restricted-access system or device 620. Processor 650 may generate the commands to send over control interface 680 in response to authorizing access device 210 and successfully completing the two-part security solution to ensure that the received signaling from access device 210 is transmitted by access device 210 and not a relay attack or other intermediary device.

In some embodiments, control module 610 may include additional or fewer components. For instance, control module 610 may include one or more sensors for detecting features of the environment surrounding control module 610. The one or more sensors of control module 610 may correspond to sensors 520 of access device 210, and may be used to obtain an expected set of values to compare against the environmental data provided by access device 210. In some embodiments, control module 610 may include a wired or wireless network connection to other components of an access control system. For instance, control module 610 may include a network connection to an ACU, and may transmit access credentials, environmental data, and/or other data to ACU in order for ACU to perform the access procedure and/or two-part security solution on behalf of control module 610.

Restricted-access system or device 620 may include any physical or logical device or system with restricted or configurable access. In some embodiments, restricted-access system or device 620 may include or operate in at least one of two states, and control module 610, ACU, or other access control system device may direct, control, or change the states of restricted-access system or device 620 via messaging passed to restricted-access system or device 620.

In some embodiments, restricted-access system or device 620 may include vehicles, points of entry (e.g., doors, gates, turnstiles, elevators, and/or other physical barriers), security systems, computer systems, climate control systems, and/or other remote keyless systems and devices. The different controllable states of a vehicle may include locking and unlocking doors, turning on and off the engine, stopping or moving the vehicle, etc. Similarly, the different controllable states of a point of entry may include opening or closing access, alerting devices or persons as to the presence of a user, changing indicator lights, locking or unlocking a locking mechanism of the point of entry, etc.

In some embodiments, each secured resource 220 may operate independently. In particular, control module 610 of a secured resource 220 may directly control access to restricted-access system or device 620 of that secured resource 220.

In some embodiments, two or more secured resources 220 may be part of an access control system. In some such embodiments, access devices 210 may request and receive access to different secured resources 220 based on authorization and relay attack detection performed at an ACU. Access devices 210 may provide access credentials and the environmental data over encrypted communication channels that are established with the ACU, and/or may provide the access credentials and the environmental data over encrypted communication channels that are established with control module 610 of a target secured resource 220, and control module 610 may forward the messaging to ACU for a control decision or may perform the control decision in conjunction with or independent of the ACU.

Figure 7:
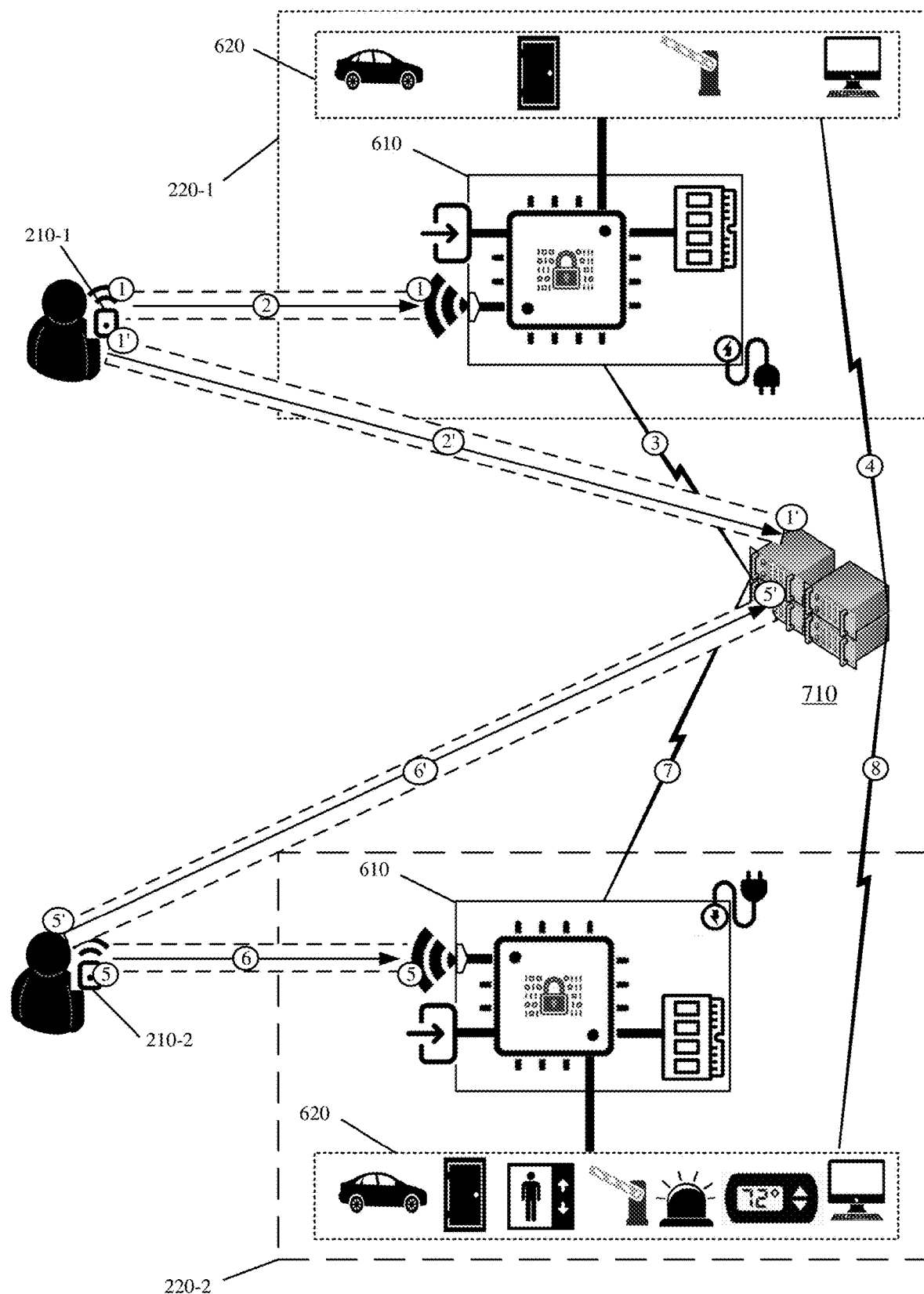
FIG. 7 illustrates an example of a distributed access control system with different secured resources, and an access control unit ("ACU") providing access control via the two-part security solution in accordance with some embodiments presented herein.

FIG. 7 illustrates an example of a distributed access control system with different secured resources 220, and ACU 710 providing access control via the two-part security solution in accordance with some embodiments presented herein. In particular, the distributed access control system of FIG. 7 includes first secured resource 220-1 and second secured resource 220-2 (hereinafter sometimes collectively referred to as "secured resources 220" or individually as "secured resource 220") at different locations, and ACU 710 that may be communicably coupled to control modules 610 of each secured resource 220.

An encrypted communication channel may be established (at 1) between access device 210-1 and control module 610 of first secured resource 220-1 in response to a user action that provides input to input device 640, or in response to access device 210-1 or first secured resource 220-1 detecting signaling of the other device. Access device 210-1 may transmit (at 2) a request, access credentials, and/or environmental data to control module 610 of first secured resource 220-1 via the encrypted channel, and control module 610 may forward (at 3) the messaging to ACU 710 via a back-haul wired or wireless network connection to ACU 710.

In response to initiating the access procedure and the two-part security solution (because of a user action or because of access device 210-1 or secured resource 220-1 detected signaling), access device 210-1 may, additionally or alternatively, establish (at 1') an encrypted network connection directly with ACU 710 over a long-range network (e.g., WiFi, LTE, 5G, etc.), and may send (at 2') the request, access credentials, and/or environmental data directly to ACU 710.

In some embodiments, the messaging that is directly sent to ACU 710 may include an identifier that identifies that the requested access is directed to first secured resource 220-1. In some embodiments, the first encrypted communication channel with control module 610 of secured resource 220-1 may be established (at 1) over a first wireless network (e.g., Bluetooth), and the second encrypted communication channel with ACU 710 may be established (at 1') over a different second wireless network (e.g., WiFi or 4G). Access device 210-1 may send the same messaging to ACU 710 via different network connections or paths for performance reasons or for redundancy.

ACU 710 may receive (at 2 and 2') the messaging, may determine if access device 210-1 is authorized to access first secured resource 220-1, and may perform the second part of the two-part security solution using the environmental data to determine the presence or absence of a relay attack. ACU 710 may send (at 4) a command to control module 610 or system or device 620 of first secured resource 220-1 to provide access in response to authorizing the access credentials provided by access device 210-1 and detecting the absence of a relay attack. In some embodiments, ACU 710 may authorize access and complete the two-part security solution based on whichever of the encrypted signaling from control module 610 or the encrypted signaling from access device 210-1 is first to arrive at ACU 710.

Similarly, an encrypted communication channel may be established (at 5) between access device 210-2 and control module 610 of second secured resource 220-2 in response to a user action that provides input to input device 640 of second secured resource 220-2, or in response to access device 210-2 or second secured resource 220-2 detecting signaling of the other device. Another encrypted communication channel may, additionally or alternatively, be established (at 5') between access device 210-2 and ACU 710. Consequently, encrypted signaling from access device 210-2 may be submitted (at 6') directly to ACU 710 via an encrypted channel, session, or connection established with ACU 710, or indirectly (at 6 and 7) to ACU 710 via messaging forwarded by control module 610 of second secured resource 220-2 to ACU 710. ACU 710 may then control (at 8) access to second secured resource 220-2 based on whether access device 210-2 is authorized to access second secured resource 220-2, and based on whether ACU 710 can detect the absence of a relay attack using the environmental data provided by access device 210-2.

Figure 8:
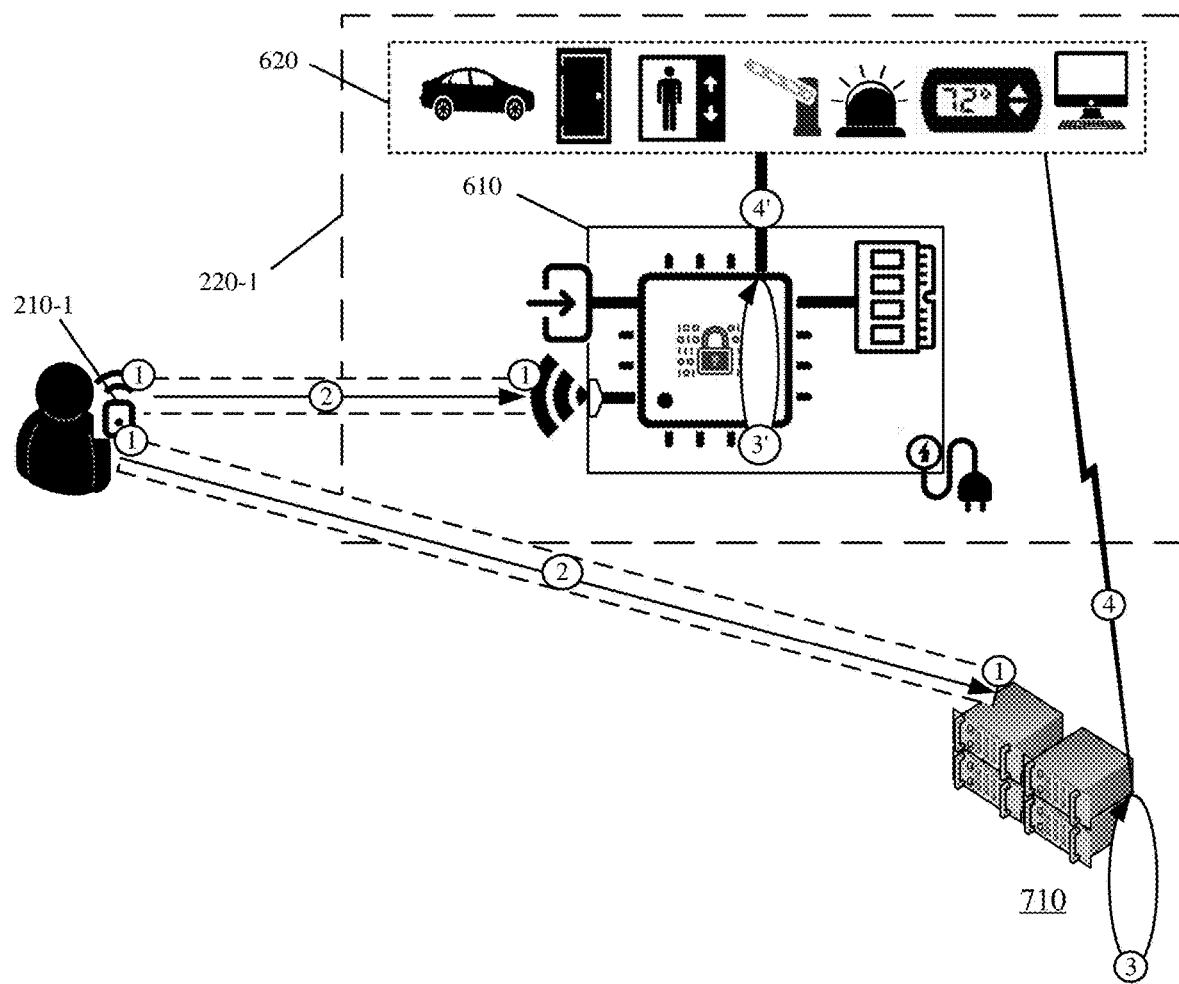
FIG. 8 illustrates an example of a distributed access control system with secured resources, and the ACU independently controlling access via the two-part security solution in accordance with some embodiments presented herein.

FIG. 8 illustrates an example of a distributed access control system with secured resources 220, and ACU 710 independently controlling access via the two-part security solution in accordance with some embodiments presented herein. In response to initiating the access procedure, access device 210-1 may establish (at 1) a secure connection with ACU 710 and control module 610 of first secured resource 220-1 over different wireless networks or using different wireless signaling. Access device 210-1 may send (at 2) the same messaging through each secure connection.

ACU 710 and control module 610 may independently authorize access and check (at 3 and 3') for relay attacks using the two-part security solution as soon as the messaging from access device 210-1 is received at each component of the access control system. Whichever component successfully authorizes access device 210-1 for access to first secured resource 220-1 and verifies that the messaging is not transmitted via a relay attack may then grant (at 4) access to restricted-access system or device 620 of first secured resource 220-1. For instance, in FIG. 8, ACU 710 authorizes and verifies that there is no relay attack before control module 610, and sends instruction to provide (at 4) access to restricted-access system or device 620 before control module 610. ACU 710 may receive the messaging from access device 210 earlier because of less latency network latency or congestion and/or because of greater compute power for authorizing access and performing the two-part security solution. Subsequent instruction from control module 610 to provide (at 4') access to restricted-access system or device 620 for the same authorized user or access device 210 may be ignored when arriving within a time window of the instruction from ACU 710. In this manner, access device 210-1 may gain access to first secured resource 220-1 via the fastest performing component of the access control system, and may also benefit from the redundancy in case one of the components or the network path to one of the components experiences a failure or bottleneck.

In some embodiments, ACU 710 may receive the messaging or signaling from access device 210 before control module 610 when access device 210 is configured to establish (at 1) the secure connection only with control module 610. Messaging may be passed to ACU 710 without a secure or encrypted connection because the relay attack may only be effective in capturing and relaying the signaling passed between access device 210 and control module 610. Specifically, the location of ACU 710 may be unknown to the attackers, and the relay attack devices may be unable to intercept and prevent the transmission of the messaging over the wireless networks used to communicate with ACU 710.

Figure 9:
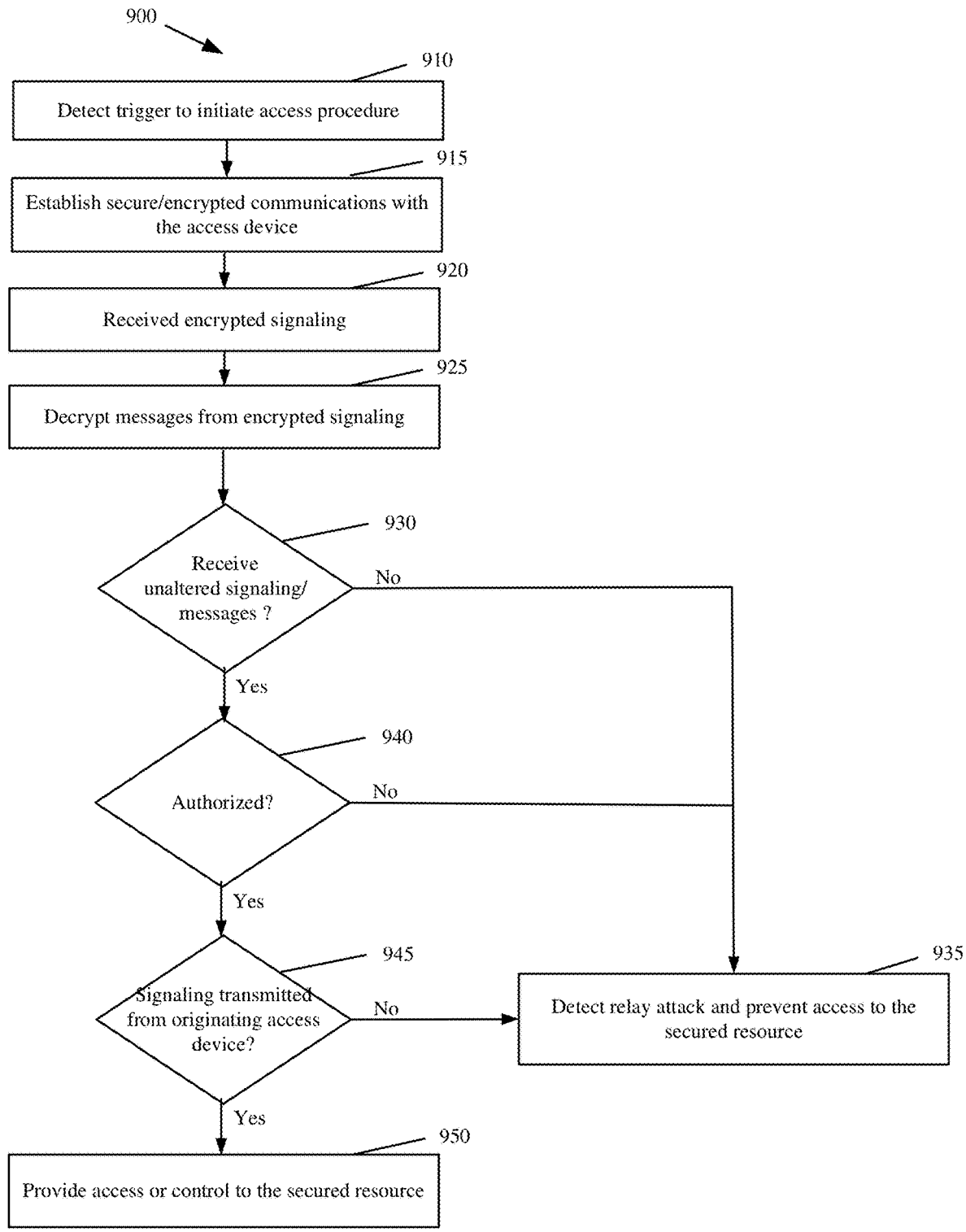
FIG. 9 presents a process for authorizing access to a secured resource and performing relay attack detection in accordance with some embodiments.

FIG. 9 presents a process 900 for authorizing access to secured resource 220 and performing relay attack detection based on signaling that is verified to have been transmitted by an access device and not an intermediary device that relays signaling from the access device. Process 900 may be performed directly at secured resource 220 by control module 610 of that secured resource 220. Additionally or alternatively, process 900 may be performed by ACU 710 that operates in the same access control system as secured resource 220.

Process 900 may include detecting (at 910) a trigger that initiates the procedure for requesting and/or obtaining access to secured resource 220. Detecting (at 910) the trigger may include detecting a touch or specific gesture with input device 640 of control module 610. Detecting (at 910) the trigger may include either access device 210 or control module 610 detecting signaling of the other device when the other device enters into wireless range. For instance, control module 610 may wirelessly broadcast an identifier via radio 630 a short distance from secured resource 220 (e.g., ten feet), access device 210-1 may issue a request to access secured resource 220 in response to receiving the identifier, and the request may serve as the trigger for initiating the access procedure.

Process 900 may include establishing (at 915) a secure or encrypted channel, session, or connection between access device 210 and secured resource 220. Establishing (at 915) the secure or encrypted channel may include performing a security handshake to select an encryption protocol and cipher keys for encrypting and decrypting subsequent signaling between the devices. The encryption may be established using the private encryption keys of access device 210 and secured resource 220, wherein the private encryption keys are not shared with other devices, and therefore cannot be intercepted or used by other devices. Consequently, encrypted signaling exchanged between access device 210 and secured resource 220 cannot be decrypted by other devices even if the signaling is intercepted. Moreover, other devices cannot inject their own messages into the encrypted channel, and any modification of the encrypted signaling between access device 210 and secured resource 220 can be detected since the modified encrypted signaling will result in a decrypted message that is not decipherable or will lead to a payload that is mismatched with the payload checksum. Establishing (at 915) the encryption communications successfully completes the first part of the two-part security solution that is implemented as part of the procedure to authorize and/or obtain access to secured resource 220.

Upon establishing the encrypted channel, session, or connection, process 900 may include receiving (at 920) encrypted signaling from access device 210. The encrypted channel, session, or connection with access device 210 ensures that the encrypted signaling is originated by access device 210 because signaling that is encrypted with a private key of any device other than access device 210 will result in signaling that cannot be decrypted or deciphered at the opposite end of the encrypted channel, session, or connection (e.g., by secured resource 220 or ACU 710).

Process 900 may include decrypting (at 925) the received signaling using cipher keys that were negotiated when establishing (at 910) the encrypted channel, session, or connection with access device 210. As part of decrypting (at 925) the received signaling, process 900 may include detecting (at 930) if the encrypted signaling or messaging decrypted (at 925) from the signaling is received without having been interfered with or modified during transmission. For instance, if the encrypted signaling cannot be decrypted into valid messages or if the decrypted message payload is mismatched with the payload checksum, then the receiving device can detect interference or modification of the encrypted signaling.

In response to detecting (at 930—No) that the encrypted signaling or decrypted messages have been interfered with or modified during transmission, process 900 may include preventing (at 935) access to secured resource 220. In this instance, the encrypted signaling fails the first part of the two-part security solution because secured resource 220 or ACU 710 detects a relay attack. Specifically, process 900 detects (at 930) the presence of an intermediary device that modifies signaling originated by access device 210, or that injects its own signaling in the encrypted communications with access device 210.

In response to detecting (at 930—Yes) that the encrypted signaling or decrypted messages were received without having been interfered with or modified during transmission, process 900 may include determining (at 940) whether access device 210 has or is associated with sufficient access privileges to access secured resource 220. In some embodiments, establishing (at 915) the secure or encrypted communications may include performing a mutual authentication procedure in which access device 210 is identified and authenticated. Process 900 may base the authorization determination (at 940) based on this identification and authentication of access device 210. In some embodiments, the messages that are extracted from the encrypted signaling provided by access device 210 may include access credentials or some other identifier(s), and secured resource 220 or ACU 710 may base the authorization determination (at 940) on this extracted data. For instance, access device 210 may provide a unique identifier, and secured resource 220 may perform a lookup of the unique identifier or may perform a calculation based on the unique identifier to determine (at 940) whether access device 210 is permitted to access secured resource 220. For instance, access device 210 may submit access credentials that are encoded with a list of one or more secured resources 220 that have been authorized for access. Similarly, ACU 710 may receive the unique identifier of access device 210 and another identifier that identifies secured resource 220 as the target of the requested access. ACU 710 may perform a lookup of the identifiers to determine (at 940) whether access device 210 is permitted to access secured resource 220.

In response to determining (at 940—No) that access device 210 has insufficient privileges for accessing secured resource 220, process 900 may including preventing (at 935) access to secured resource 220. For instance, secured resource 220 may be locked or otherwise made inaccessible. Additionally, the encrypted connection with access device 210 may be closed and/or subsequent messaging from access device 210 may be discarded.

In response to determining (at 940—Yes) that access to secured resource 220 is authorized, process 900 may perform the second part of the two-part security solution provided herein to detect the presence or absence of a relay attack. In particular, the second part of the two-part security solution may include detecting (at 945) if the encrypted signaling received at secured resource 220 is transmitted by access device 210 and not an intermediary device that is used in a relay attack to transfer signaling between access device 210 and secured resource 220. It is important to note that the second part of the two-step security solution differentiates between the device that originates the encrypted signaling (e.g., access device 210), and the device that transmits the encrypted signaling to secured resource 220 or ACU 710. The presence or absence of the intermediary device and/or relay attack may be detected (at 945) based on the environmental data that is obtained by onboard sensor 520 and/or radio 510 of access device 210, and that is included in the messages that are decrypted (at 925) from the encrypted signaling originating from access device 210.

In some embodiments, detecting (at 945) the device transmitting the encrypted signaling to secured resource 220 or ACU 710 may be based on the environmental data that is extracted from the messaging decrypted (at 925) from the encrypted signaling. As noted above, the environmental data may include data for a position that is within a specified distance or location of secured resource 220. For instance, the environmental data may provide geographical coordinates, an altitude, and/or other data from which a position of access device 210 relative to secured resource 220 may be detected (at 945). In some embodiments, the proximity of access device 210 to secured resource 220 may be derived from comparing the environmental data to a set of expected data. In this instance, the position of access device 210 may be indirectly determined. For instance, if sounds captured by a microphone of access device 210 match to sounds captured by a microphone of secured resource 220, then the proximity of access device 210 to secured resource 220 may be determined. Similarly, if images taken by the devices or wireless networks detected by the devices match or are similar, then the proximity of access device 210 to secured resource 220 may be determined.

In response to detecting (at 945—No) that the device transmitting the encrypted signaling to secured resource 220 or ACU 710 is different than access device 210 that originates the encrypted signaling (e.g., secured resource 220 or ACU 710 receiving the encrypted signaling originated by access device 210 from a device other than access device 210), process 900 may include preventing (at 935) access to secured resource 220. Here, the encrypted signaling, and the environmental data provided therein, fails the second part of the two-part security solution as process 900 has detected (at 945) a relay attack by virtue of the encrypted signaling with authorized credentials from access device 210 reaching secured resource 220 or ACU 710, but the environmental data obtained by access device 210 indicating that access device 210 is out of range of secured resource 220.

As a result of determining (at 930) that the encrypted signaling from access device 210 was not modified or interfered with (e.g., successfully complete the first part of the two-part security solution), successfully authorizing (at 940) access to secured resource 220, and detecting (at 945—Yes) that secured resource 220 or ACU 710 receives the encrypted signaling directly from access device 210 and not some intermediary device (e.g., successfully complete the second part of the two-part security solution), process 900 may including providing (at 950) access to secured resource 220. For instance, providing (at 950) access may include ACU 710 or control module 610 of secured resource 220 sending a command to unlock a door, gate, turnstile, or other physical barrier that restricts access to a specific point of entry (e.g., restricted-access system or device 620 of secured resource 220). As other examples, providing (at 950) access may include ACU 710 or control module 610 operating an elevator to move to a restricted floor, turning on a vehicle, providing access to specific files on a computer, turning on lighting, setting a climate control system to a specific temperature, turning off a security system or alarm, etc.

In some embodiments, the environmental data provided by access device 210 may be obfuscated. Obfuscation of the environmental data may be provided for privacy reasons and/or to prevent location tracking of access device 210 to the access control system, ACU 710, secured resource 220, and/or other devices that can receive and/or decrypt the signaling sent by access device 210. Nevertheless, the obfuscated environmental data may still be used to verify proximity or location of access device 210 relative to secured resource 220.

Figure 10:
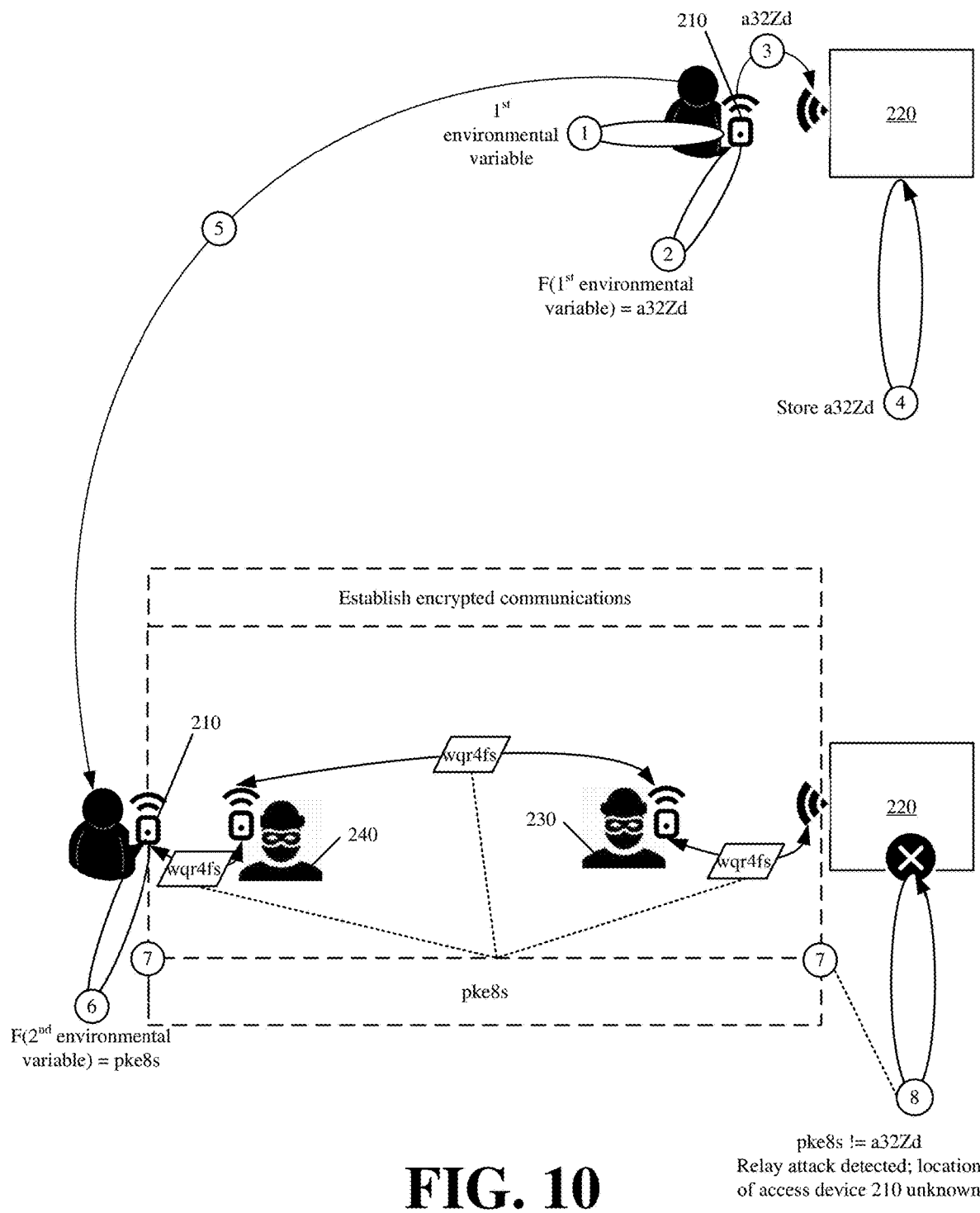
FIG. 10 illustrates an example of environmental data obfuscation in accordance with some embodiments.

FIG. 10 illustrates an example of environmental data obfuscation in accordance with some embodiments. In this figure, access device 210 may perform an initial configuration procedure, whereby access device 210 is placed next to secured resource 220, obtains (at 1) first environmental data from one or more sensors to determine the position of access device 210 when placed next to secured resource 220, and hashes (at 2) the first environmental data to obscure the first environmental data and to produce a first hash result. The first hash result may be provided (at 3) to secured resource 220, and secured resource 220 may store (at 4) the first hash result to subsequently verify proximity or location of access device 210 relative to secured resource 220.

In some such embodiments, the first environmental data and the first hash result will be the same whenever access device 210 is in range of secured location 220 even though the exact location of access device 210 may differ. For example, the environmental data may include an altitude measurement for the office floor that access device 210 is located on regardless of the horizontal distance between access device 210 and secured resource 220. Similarly, the environmental data may include the SSID of a wireless network that is proximate to secured resource 220, and that can be detected by access device 210 only when access device 210 is in range of secured resource 220 regardless of the actual location of access device 210 relative to secured resource 220.

Access device 210 may move (at 5) away from secured resource 220 where it then becomes the target of a relay attack. During the relay attack, access device 210 may obtain and hash (at 6) a different second environmental data to produce a second hash result that is different than the first hash result stored (at 4) by secured resource 220. Accordingly, when access device 210 provides (at 7) the second hash result within the encrypted signaling, secured resource 220 may identify (at 8) that the second hash result differs from the stored first hash result, and as a result, may verify that the request is made as part of a relay attack (e.g., access device 210 being out-of-range of secured resource 220) without being able to track or identify the location of access device 210.

In some embodiments, access device 210 may combine a specific salt value with the environmental data prior to producing the hash results in order to further obscure the location of access device 210 from secured resource 220. The specific salt value may be selected by access device 210 or secured resource 220. In the latter case, secured resource 220 may provide the selected salt value to access device 210 for use in generating the first hash result.

In some embodiments, the initial configuration procedure may involve access device 210 providing the first environmental data to secured resource 220 without obfuscation. Secured resource 220 may then independently verify the location of access device 210 and/or verify that access device 210 is in range of secured resource 220.

In response to verifying the first environmental data and/or access device 210 to be in-range of secured resource 220, secured resource 220 may store an obfuscated value for the first environmental data. For instance, secured resource 220 may use a same hashing function that is configured on access device 210 to hash the first environmental data and to store the first hash result resulting from the hashing. In some embodiments, access device 210 may generate the first hash result using its own salt value, a salt value provided by secured resource 220, and/or its own hashing function, and may provide the first hash result to secured resource 220 for storage and subsequent usage for the two-part security solution and/or for verifying proximity of access device 210 without knowing the location of access device 210.

The two-part security solution is effective in combatting relay attacks used on access control systems that provide handsfree proximity access. Some access control systems also allow for remote access in which an authorized user can request and receive access to secured resource 220 without being in range of secured resource 220. For instance, the authorized user may request access on behalf of a visitor or guest. In some embodiments, the two-part security solution can be modified to provide relay attack protection for handsfree proximity access while supporting remote access.

To support remote access, the messaging provided by access device 210 may be modified to include the environmental data and a request identifier that identifies the request as either a handsfree proximity access request or a remote access request. Access device 210 includes the handsfree proximity access request identifier when the access procedure starts without any user action performed on access device 210. Access device 210 includes the remote access request identifier when the access procedure starts in response to user action performed on access device 210. For instance, the user may unlock access device 210, open an application on access device 210, and request remote access to a particular secured resource 220 using the application. In this case, the messaging provided by access device 210 includes the remote access identifier, and the particular secured resource 220 or ACU 710 receiving the messaging may provide access in response to authorizing the access credentials provided by access device 210 and ignoring the environmental data or determining that the environmental data is out of range of the particular secured resource 220. However, if the messages include the handsfree proximity access request identifier, then secured resource 220 or ACU 710 provides access only when the access credentials are authorized and the environmental data is verified to be in range of secured resource 220.

Figure 11:
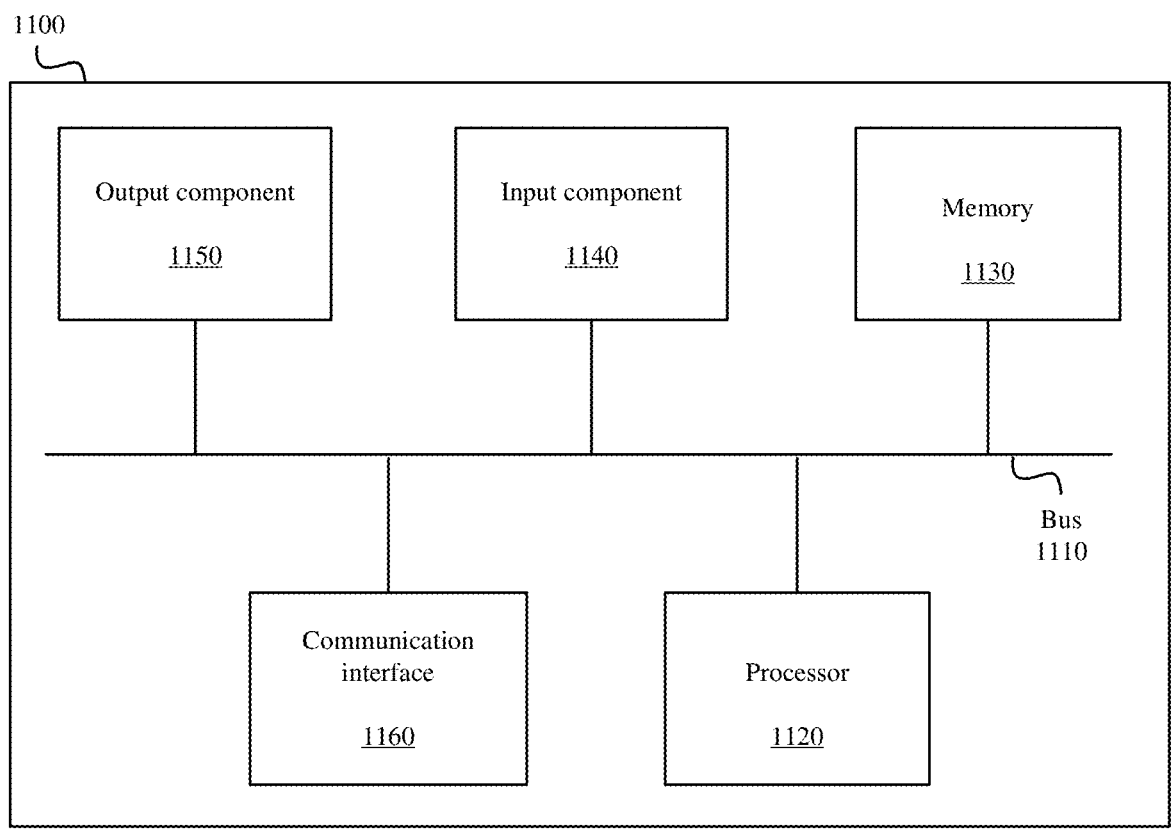
FIG. 11 illustrates example components of one or more devices, according to one or more embodiments described herein.

FIG. 11 is a diagram of example components of device 1100. Device 1100 may include additional components of access device 210, control module 610, secured resource 220, ACU 710, and/or other devices of an access control system. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   detecting, by a control module of a secured resource, signaling of a first device that is within a specified range of the secured resource;
   establishing an encrypted channel between a second device and the control module via the signaling of the first device;
   receiving, from the first device, encrypted signaling that is originated by the second device over the encrypted channel;
   authorizing access to the secured resource based on access credentials associated with the second device or a user of the second device;
   extracting environmental data from the encrypted signaling, the environmental data identifying at least one feature of an environment in which the second device is located;
   preventing access to the secured resource despite authorizing the access, in response to detecting the first device to be at least one intermediary device, that transmits the encrypted signaling from the second device while the first device is within the specified range of the secured resource, based on the environmental data mapping to a location that is outside the specified range of the secured resource.

2. The method of claim 1 further comprising:
   providing access to the secured resource in response to authorizing the access and determining the first device and the second device to be a same device based on the environmental data mapping to a location that is within the specified range of the secured resource at which signaling of the first device is detected.

3. The method of claim 2, wherein providing access comprises at least one of unlocking, opening, accessing, or operating the secured resource.

4. The method of claim 1 further comprising:
   detecting that the encrypted signaling originated by the second device is changed prior to receiving the encrypted signaling; and
   preventing access to the secured resource in response to detecting the first device to be the at least one intermediary device based on detecting that the encrypted signaling is changed.

5. The method of claim 4, wherein detecting that the encrypted signaling is changed comprises at least one of:
   determining that a checksum included with the encrypted signaling does not match to a payload that is decrypted from the encrypted signaling;
   determining that messages decrypted from the encrypted signaling are corrupted.

6. The method of claim 1, wherein the environmental data is populated using output of a sensor or radio of the second device, and wherein output of the sensor or radio of the second device differs from output of a similar sensor or radio of the first device when the first device is the at least one intermediary device.

7. The method of claim 1 further comprising:
   determining a position of the second device relative to the secured resource directly from the environmental data.

8. The method of claim 7,
   wherein the environmental data specifies a first altitude measurement taken by an altimeter or other sensor of the second device that is different than a second altitude measurement taken by an altimeter or other sensor of the first device when the first device is the at least one intermediary device; and
   wherein the environmental data maps to the location that is outside the specified range of the secured resource as a result of the first altitude measurement corresponding to a different building floor or level than a particular building floor or level on which the secured resource is located.

9. The method of claim 7,
   wherein the environmental data specifies coordinates; and
   wherein the environmental data maps to the location that is outside the specified range of the secured resource as a result of the coordinates mapping to a location that is a certain distance away from the secured resource.

10. The method of claim 1 further comprising:
    deriving a position of the second device relative to the secured resource by determining similarity between the environmental data and a set of expected values corresponding to at least one feature of an environment in which the secured resource is located.

11. The method of claim 10,
    wherein the environmental data comprises output of at least one sensor of the second device that is different than output of the at least one sensor of the first device when the first device is the at least one intermediary device; and wherein the environmental data maps to the location that is outside the specified range of the secured resource as a result of the output of the at least one sensor of the second device deviating by a threshold amount from output of the at least one sensor of the secured resource.

12. The method of claim 10, wherein the environmental data specifies one or more networks or devices detected by a radio of the second device, and wherein the one or more networks or devices detected by the radio of the second device differ from one or more networks or devices detected by a radio of the first device when the first device is the at least one intermediary device; and wherein the environmental data maps to the location that is outside the specified range of the secured resource as a result of the one or more networks or devices detected by the radio of the second device differing by a threshold amount from one or more networks or devices detected by a radio of the secured resource.

13. The method of claim 10, wherein the environmental data specifies sounds or images captured by a sensor of the second device, and wherein the sounds or images captured by the sensor of the second device differ from sounds or images captured by a similar sensor of the first device when the first device is the at least one intermediary device; and wherein the environmental data maps to the location that is outside the specified range of the secured resource as a result of the sounds or images captured by the sensor of the second device differing by a threshold amount from sounds or images captured by a similar sensor of the secured resource.

14. The method of claim 1, wherein the access credentials correspond to a unique identifier; and the method further comprising receiving the unique identifier while establishing the encrypted channel or from the encrypted signaling.

15. The method of claim 1 further comprising:

detecting a user action, that initiates said establishing of the encrypted channel, with an input sensor located on or next to the secured resource, wherein detecting the user action comprises detecting a touch or gesture.

16. The method of claim 1 further comprising:

obtaining, via a sensor located on or next to the secured resource, different second environmental data identifying at least one feature of an environment in which the secured resource is located; and comparing the environmental data extracted from the encrypted signaling to the second environmental data; and mapping the location of the second device to be outside the specified range of the secured resource based on the environmental data extracted from the encrypted signaling differing from the second environmental data by a threshold amount.

17. The device of claim 1 further comprising:

an interface controlling access to the secured resource; and wherein the set of processor-executable instructions further include processor-executable instructions to:

provide access to the secured resource based on a command passed through the interface in response to authorizing the access and the environmental data mapping to a location that is within the specified location of the secured resource.

18. The device of claim 17, wherein the secured resource comprises at least one of a physical barrier that restricts access to a specific point of entry, a vehicle, a lighting system, a climate control system, a computer system, and a security system.

19. A device controlling access to a secured resource, the device comprising:

a wireless radio;

a non-transitory computer-readable medium storing a set of processor-executable instructions; and one or more processors configured to execute the set of processor-executable instructions, wherein executing the set of processor-executable instructions causes the one or more processors to:

detect signaling of a first device that is within a specified range of the secured resource;

establish an encrypted channel with a second device via the signaling of the first device;

receive, from the first device, encrypted signaling that is originated by the second device over the encrypted channel;

authorize access to the secured resource based on access credentials associated with the second device or a user of the second device;

extract environmental data from the encrypted signaling, the environmental data identifying at least one feature of an environment in which the second device is located;

prevent access to the secured resource despite authorizing the access, in response to detecting the first device to be at least one intermediary device, that transmits the encrypted signaling from the second device while the first device is within the specified range of the secured resource, based on the environmental data mapping to a location that is outside the specified range of the secured resource.

20. A method comprising:

establishing an encrypted channel between a first device, in a first operating region, and a control module of a secured resource, in a second operating region;

receiving encrypted signaling that is originated by the first device over the encrypted channel;

authorizing access to the secured resource based on access credentials associated with the first device or a user of the first device;

extracting environmental data from the encrypted signaling, the environmental data identifying at least one feature of the first operating region;

detecting at least two intermediary devices, that exchange signaling of the encrypted channel directly with the first device from within the first environment and that exchange signaling of the encrypted channel directly with the control module from within the second environment based on the environmental data mapping to the first operating region and the first operating region differing from the second operating region; and preventing access to the secured resource, despite authorizing the access, in response to detecting the at least two intermediary devices.

* * * * *